T. V. LE ROY.
Car-Axle Box.

No. 221,737.  Patented Nov. 18, 1879.

Witnesses.
B. C. Pole.
John F. Schrader

Inventor.
Tennis V. LeRoy

UNITED STATES PATENT OFFICE.

TEUNIS V. LE ROY, OF UTICA, NEW YORK.

IMPROVEMENT IN CAR-AXLE BOXES.

Specification forming part of Letters Patent No. 221,737, dated November 18, 1879; application filed October 13, 1879.

*To all whom it may concern:*

Be it known that I, TEUNIS V. LE ROY, of Utica, in the county of Oneida and State of New York, have invented certain new and useful Improvements in Railroad-Car Axle-Boxes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a certain construction in the bearings used on the journal of railroad-car axles.

The nature thereof consists in providing certain spaces to be filled up with a softer metal, the peculiar arrangement of those spaces, and the shape and projections made by the filled-in metal, all of which is more fully hereinafter set forth.

Figure 1:
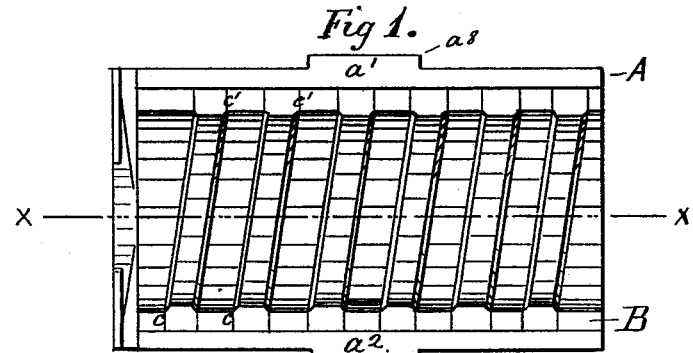
Figure 2:
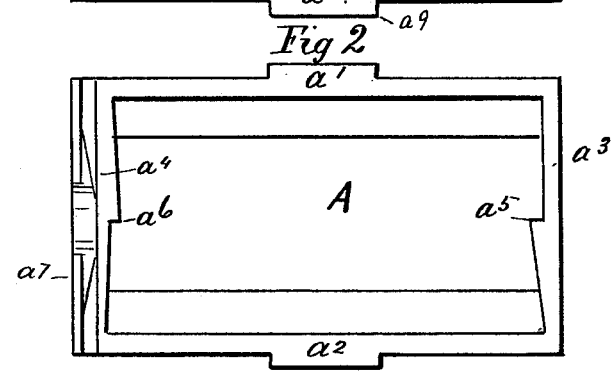
Figure 3:
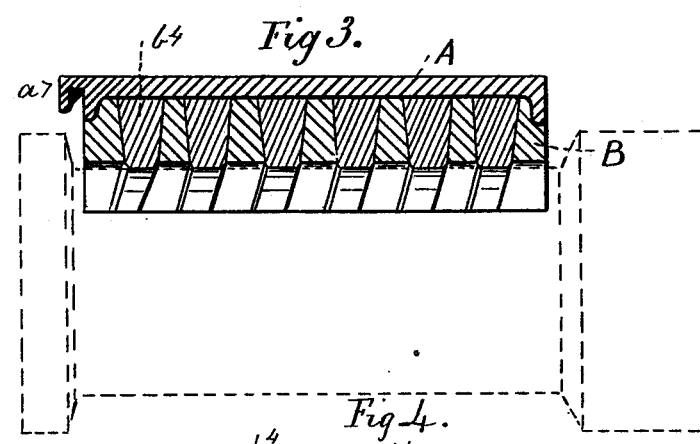
Figure 4:
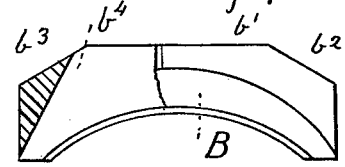

In the accompanying drawings, in which similar letters of reference indicate like parts, Figure 1 represents a plan of the bearing-brass and socket. Fig. 2 represents a plan of the socket or casing without the bearing. Fig. 3 represents a cross-section on line $x\ x$ of Fig. 1, showing, in dotted lines the position of the bearing with reference to the journal of the axle-shaft. Fig. 4 represents a cross-section of the bearing, showing its end in elevation.

The socket A, which is provided to receive the brass bearing B, is made with flanges all around, $a'$, $a^2$, $a^3$, and $a^4$. The two latter at the ends are rounded out to conform to the shape of the axle-shaft. The interior of the socket is provided with the two diagonal pointed stops $a^5$ and $a^6$. These are upon the flanges $a^3$ and $a^4$, and serve to hold the brass bearing in position, preventing slack motion, and at the same time permitting and compelling the brass bearing to sit down fairly in the socket and find its proper bearing on the journal of the axle. At the time of this settling down the soft-metal filling, being flush on the upper side of the bearing, makes it adjustable to old or imperfectly-shaped sockets or casings by the expansion of the soft metal into the irregular spaces. On the outside of the socket A are the projections $a^8$ and $a^9$, and at the end $a^7$. This outward form of the socket allows it to be inserted in its proper positions in the oil-box of the car, projection $a^7$ being to take hold of when it is desired to remove the brass bearing or examine the same.

The brass bearing, hereinafter called only the "brass," B, is flat at its top $b'$, and has two sloping sides, $b^2$ and $b^3$, and is then straight down at right angles with the top $b'$, and at the ends has jogs to fit the diagonal projections $a^5$ and $a^6$ of the socket A. The form of the outside or upper side of the brass B is cast so as to conform to the inside of the socket A, in which it is set. The brass B is also cast with diagonal openings $b^4$ clear through for the reception of the soft-metal filling. These openings are dovetail in shape, and are so arranged that in crossing the brass B the foot of one, $c$, will be about the head-point $c'$ of the next. The dovetail form holds the filling-in metal, and by its form presents equal faces of brass and soft metal to the journal of the axle.

The soft metal is made to project out beyond the brass on its inside surface, so that there may be sufficient of this metal to flatten out or expand and adjust the shape of the under side of the bearing or brass B to any journal when worn or out of shape. The diagonal form of the brass and filled-in metal, fitting close to the journal, serves to equally distribute the weight, and saves undue or unequal wearing of the journal or brass B at any part of the same.

As the brass is almost unyielding, the oil will follow up the softer metal, and the journal, revolving over the alternate faces of brass and filling, will be fully lubricated. The soft lead is in itself a lubricator, and the non-conducting properties of the same will aid to prevent the heating of the brass.

Having thus fully described the construction and operation of my invention, what I claim, and desire to secure by Letters Patent of the United States, is as follows:

1. In a bearing constructed of alternate ribs of hard and soft metal, the projection of the soft metal above and below the hard metal, for the purposes set forth.

2. A socket or casing provided with diagonal stops and flanges to guide and hold the bearing B in position.

In testimony that I claim the foregoing I have hereunto set my hand and seal this 7th day of October, 1879.

TEUNIS V. LE ROY. [L. S.]

Witnesses:
 WILLIAM J. McINCUN,
 JOHN F. SCHRADER.